US012659132B2

(12) United States Patent
Bandy et al.

(10) Patent No.: US 12,659,132 B2
(45) Date of Patent: Jun. 16, 2026

(54) PROVIDING RANDOM NUMBERS OVER AN INSECURE CHANNEL USING DISGUISED CYPHERTEXTS

(71) Applicant: Matrics2, Inc., Warba, MN (US)

(72) Inventors: William R. Bandy, Gambrills, MD (US); Michael R. Arneson, Warba, MN (US)

(73) Assignee: Symmatrics, Inc., Severna Park, MD (US)

( * ) Notice: Subject to any disclaimer, the term of this patent is extended or adjusted under 35 U.S.C. 154(b) by 35 days.

(21) Appl. No.: 18/787,274

(22) Filed: Jul. 29, 2024

(65) Prior Publication Data

US 2025/0038953 A1      Jan. 30, 2025

Related U.S. Application Data

(60) Provisional application No. 63/516,034, filed on Jul. 27, 2023.

(51) Int. Cl.
*H04L 29/06* (2006.01)
*H04L 9/06* (2006.01)
*H04L 9/08* (2006.01)

(52) U.S. Cl.
CPC .......... *H04L 9/0618* (2013.01); *H04L 9/0822* (2013.01); *H04L 9/0869* (2013.01)

(58) Field of Classification Search
CPC .... H04L 9/0869; H04L 9/0618; H04L 9/0822
See application file for complete search history.

(56) References Cited

U.S. PATENT DOCUMENTS

| | | | |
|---|---|---|---|
| 2010/0161984 A1 | 6/2010 | Pauker et al. | |
| 2017/0277775 A1 | 9/2017 | Eigner et al. | |
| 2020/0267131 A1 | 8/2020 | Tal et al. | |
| 2024/0022403 A1 | 1/2024 | Bandy et al. | |
| 2025/0015984 A1* | 1/2025 | Grant ................... | H04L 9/0643 |

OTHER PUBLICATIONS

International Search Report and Written Opinion received for PCT Application No. PCT/US2024/040057, mailed on Jun. 11, 2025, 8 pages.

* cited by examiner

*Primary Examiner* — Tri M Tran
(74) *Attorney, Agent, or Firm* — WEAVER IP L.L.C.

(57) ABSTRACT

Methods, systems, apparatuses, and computer program products for providing random numbers over an insecure channel using disguised cyphertexts are disclosed. A secure access portal application receives a first cyphertext from a key deliver center (KDC), decrypts the first cyphertext using paired keys shared between the first SAP application and the KDC to obtain a transformed second cyphertext, de-transforms the transformed second cyphertext using a transformation function based on the paired keys to obtain a second cyphertext, decrypts the second cyphertext using the paired keys to obtain first a random number generated by the KDC, and generates a delivery key based at least on the first random number. The SAP application may use the delivery key to securely receive a symmetric key from the KDC, and securely communicate with another secure access portal application using the symmetric key.

20 Claims, 8 Drawing Sheets

300

302 — Receive, by a first secure access portal (SAP) application, a first cyphertext from a key deliver center (KDC)

304 — Decrypt, by the first SAP application, the first cyphertext using paired keys shared between the first SAP application and the KDC to obtain a transformed second cyphertext 306 — De-transform, by the first SAP application, the transformed second cyphertext using a transformation function based on the paired keys to obtain a second cyphertext 308 — Decrypt, by the first SAP application, the second cyphertext using the paired keys to obtain first a random number generated by the KDC 310 — Generate, by the first SAP application, a delivery key based at least on the first random number

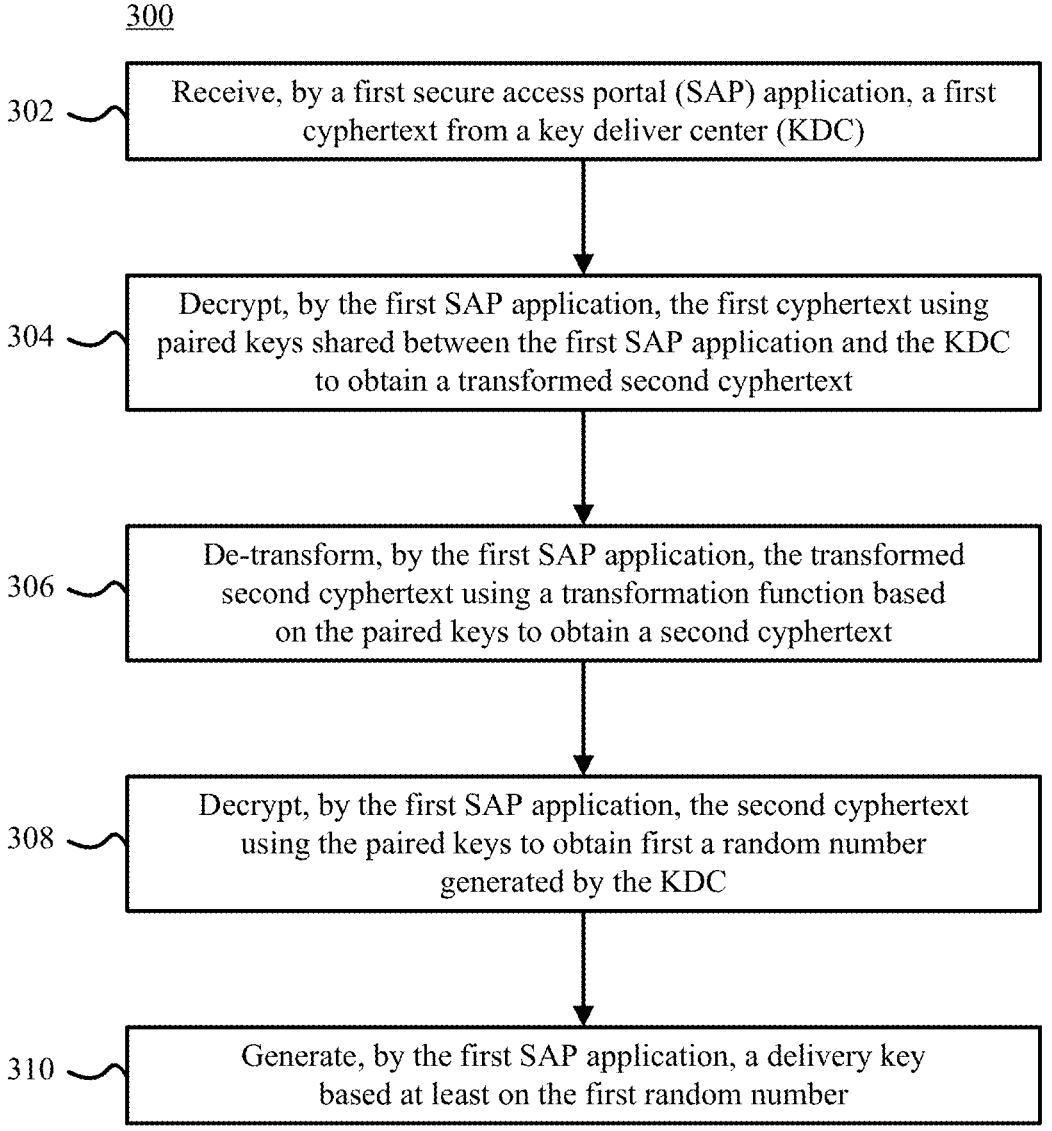

300

302　Receive, by a first secure access portal (SAP) application, a first cyphertext from a key deliver center (KDC)

304　Decrypt, by the first SAP application, the first cyphertext using paired keys shared between the first SAP application and the KDC to obtain a transformed second cyphertext 306　De-transform, by the first SAP application, the transformed second cyphertext using a transformation function based on the paired keys to obtain a second cyphertext 308　Decrypt, by the first SAP application, the second cyphertext using the paired keys to obtain first a random number generated by the KDC 310　Generate, by the first SAP application, a delivery key based at least on the first random number

FIG. 3

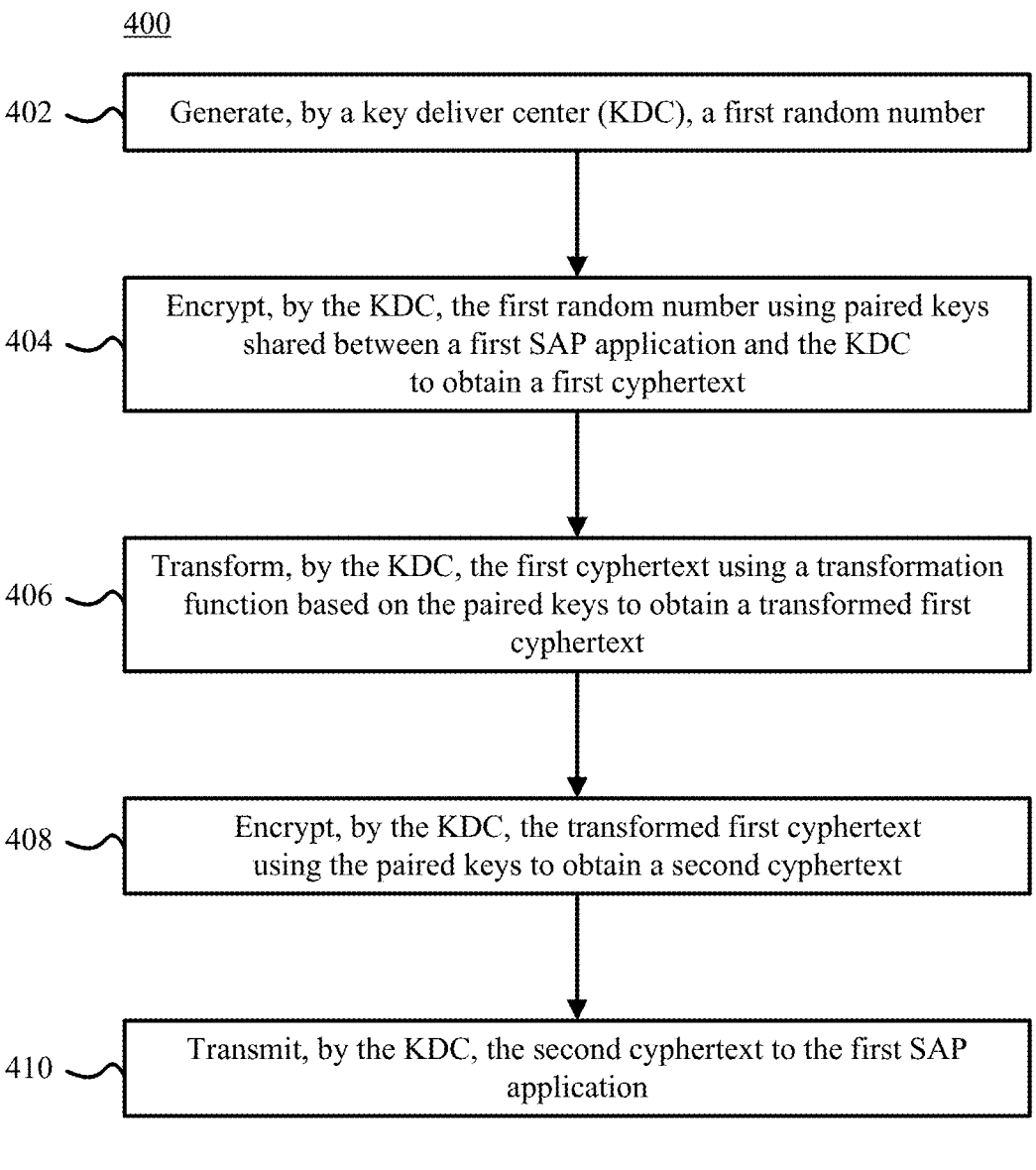

400

402 — Generate, by a key deliver center (KDC), a first random number

404 — Encrypt, by the KDC, the first random number using paired keys shared between a first SAP application and the KDC to obtain a first cyphertext 406 — Transform, by the KDC, the first cyphertext using a transformation function based on the paired keys to obtain a transformed first cyphertext 408 — Encrypt, by the KDC, the transformed first cyphertext using the paired keys to obtain a second cyphertext 410 — Transmit, by the KDC, the second cyphertext to the first SAP application

502 — Perform an exclusive-or (XOR) operation on the first random number and a second random number generated by the KDC

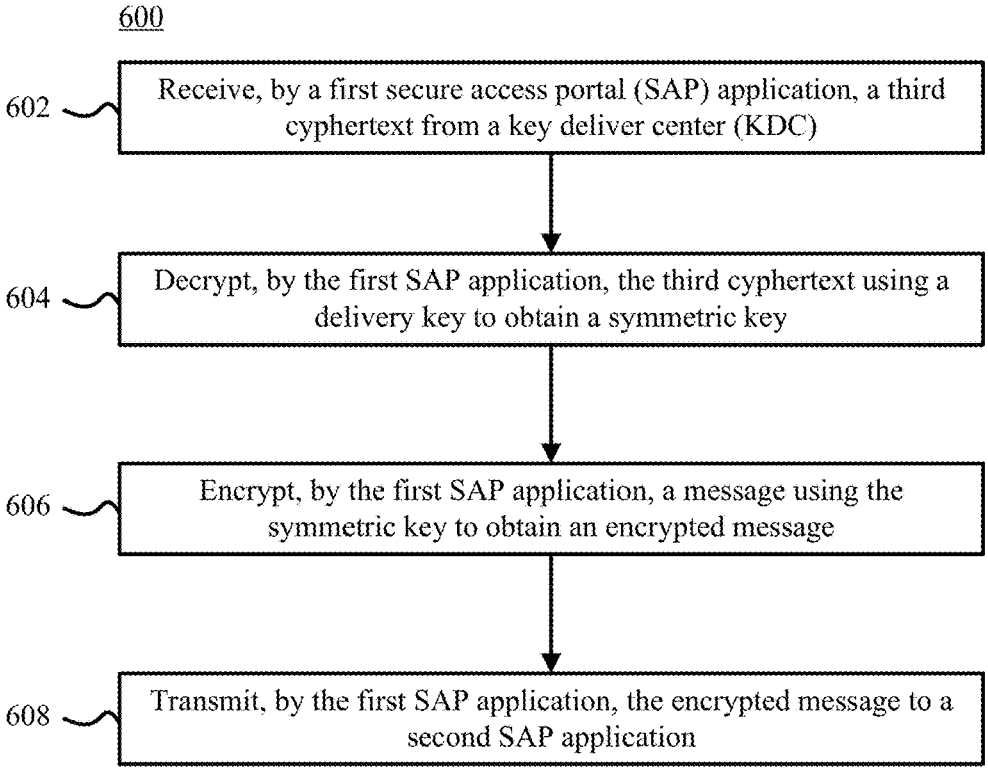

602 — Receive, by a first secure access portal (SAP) application, a third cyphertext from a key deliver center (KDC)

604 — Decrypt, by the first SAP application, the third cyphertext using a delivery key to obtain a symmetric key 606 — Encrypt, by the first SAP application, a message using the symmetric key to obtain an encrypted message 608 — Transmit, by the first SAP application, the encrypted message to a second SAP application

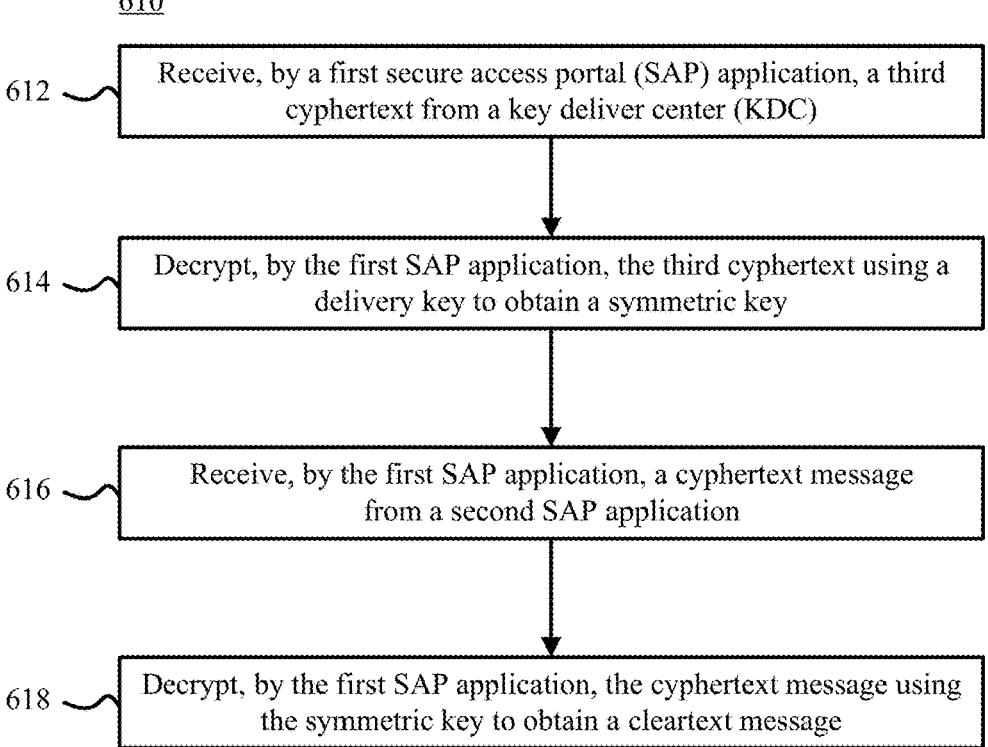

612 — Receive, by a first secure access portal (SAP) application, a third cyphertext from a key deliver center (KDC)

614 — Decrypt, by the first SAP application, the third cyphertext using a delivery key to obtain a symmetric key 616 — Receive, by the first SAP application, a cyphertext message from a second SAP application 618 — Decrypt, by the first SAP application, the cyphertext message using the symmetric key to obtain a cleartext message

FIG. 6B

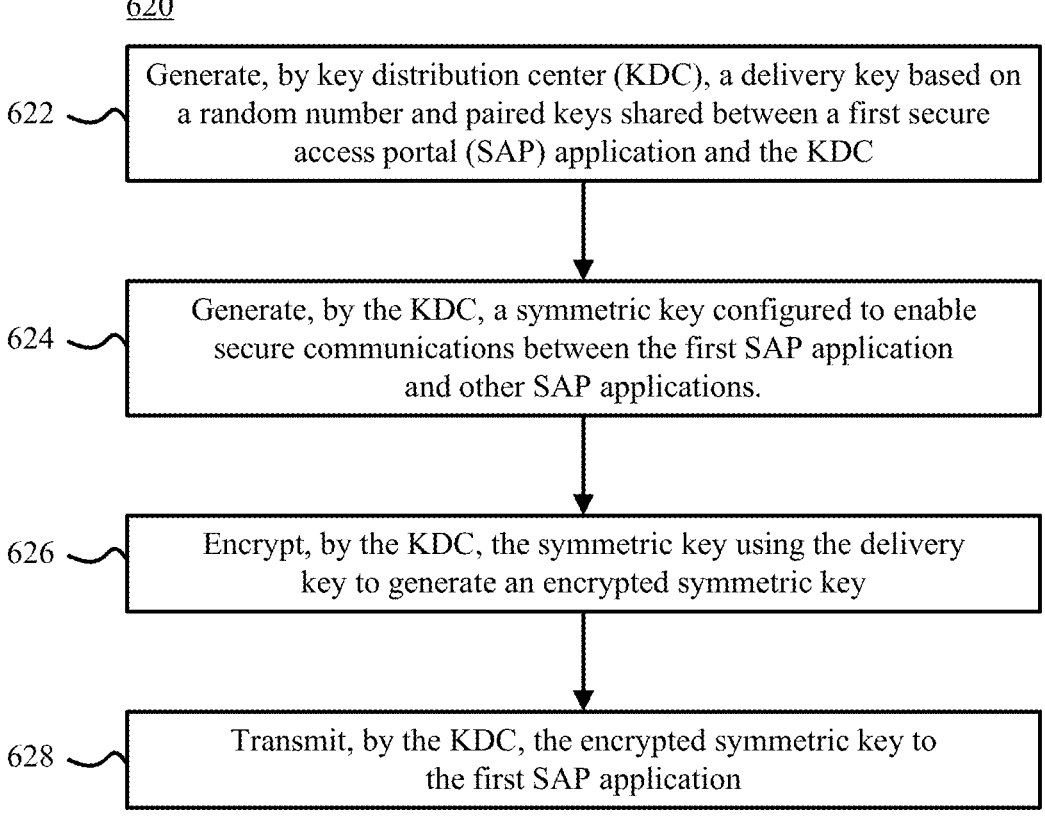

620

622 — Generate, by key distribution center (KDC), a delivery key based on a random number and paired keys shared between a first secure access portal (SAP) application and the KDC 624 — Generate, by the KDC, a symmetric key configured to enable secure communications between the first SAP application and other SAP applications.

626 — Encrypt, by the KDC, the symmetric key using the delivery key to generate an encrypted symmetric key 628 — Transmit, by the KDC, the encrypted symmetric key to the first SAP application

FIG. 6C

PROVIDING RANDOM NUMBERS OVER AN INSECURE CHANNEL USING DISGUISED CYPHERTEXTS

CROSS-REFERENCE(S) TO RELATED APPLICATION(S)

This non-provisional application claims priority to U.S. Provisional Patent Application No. 63/516,034, titled "PROVIDING TRUE RANDOM NUMBER SYMMETRIC KEYS FOR ONE-TIME PAD ENCRYPTION USING OVER THE AIR DELIVERY MEANS WITH SHARED SECRET KEYS," and filed on Jul. 27, 2023, the entirety of which is incorporated by reference herein.

This application is related to pending U.S. patent application Ser. No. 17/934,832, titled "DELIVERING RANDOM NUMBER KEYS SECURELY FOR ONE-TIME PAD SYMMETRIC KEY ENCRYPTION," filed on Sep. 23, 2022, which claims priority to provisional U.S. Patent Application No. 63/389,753, entitled "DELIVERING RANDOM NUMBER KEYS SECURELY FOR ONE-TIME PAD SYMMETRIC KEY ENCRYPTION," and filed on Jul. 15, 2022, the entireties of which are incorporated by reference herein.

BACKGROUND OF THE INVENTION

One-time pad random number symmetric key encryption uses the same random number key for both encrypting and decrypting a message. This approach was proven by in 1949 by Claude Shannon to be Information Theoretically Secure (ITS) and provides for "Perfect Secrecy" against any attack with unlimited computing resources if the random number keys: (i) are truly random, (ii) are kept completely secret, (iii) are used only once, and (iv) have a bit length at least equal to the bit length of the message.

These criteria are based on the ITS criterion that for all possible cyphertexts, the a-posteriori probabilities of occurrence of a message knowing the values of the cyphertext are equal to the a-priori probabilities of occurrence of the message without knowing the values of the cyphertext. In other words, the conditional probability of the cyphertext occurring if a message is chosen must be independent of message. These criteria are also based on the criterion that the entropy of the encryptor is greater or equal than the entropy of what is being encrypted.

For example, a 256-bit cyphertext, with $2^{256}$ possible values is a Latin Square with the $2^{256}$ possible values of for the random number key on one axis and $2^{256}$ possible values of the message on the other axis, for a total of $(2^{256})^2$ or $2^{512}$ entries in the Latin Square or $2^{256}$ entries per each value of the cyphertext. In other words, there are $2^{256}$ possible random number key and message combinations within the Latin Square that could generate a specific value of the cyphertext with no way of knowing any of the specific values of the random number key and message that were used. Accordingly, a cyphertext is considered to be ITS when the possible combinations of random number key and messages to generate the cyphertext value is equal to or greater than $2^{256}$.

Historically, the random number keys were hand-couriered in keypads to end users where they were used to encrypt and/or decrypt messages into cyphertexts that could be sent in the clear over from one user to another.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products for securely transmitting random number keys over an unsecure channel, such as, but not limited to, the Internet.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 depicts a flowchart of a process for receiving a random number using a disguised cyphertext, in accordance with an embodiment.

FIG. 4 depicts a flowchart of a process for providing a random number using a disguised cyphertext, in accordance with an embodiment.

FIG. 5 depicts a flowchart of a process for determining a delivery key based on a random number, in accordance with an embodiment.

FIG. 6A depicts a flowchart of a process for communicating using a symmetric key delivered using a delivery key, in accordance with an embodiment.

FIG. 6B depicts a flowchart of a process for communicating using a symmetric key delivered using a delivery key, in accordance with an embodiment.

FIG. 6C depicts a flowchart of a process for providing a symmetric key by encrypting it using a delivery key, in accordance with an embodiment.

Figure 1:
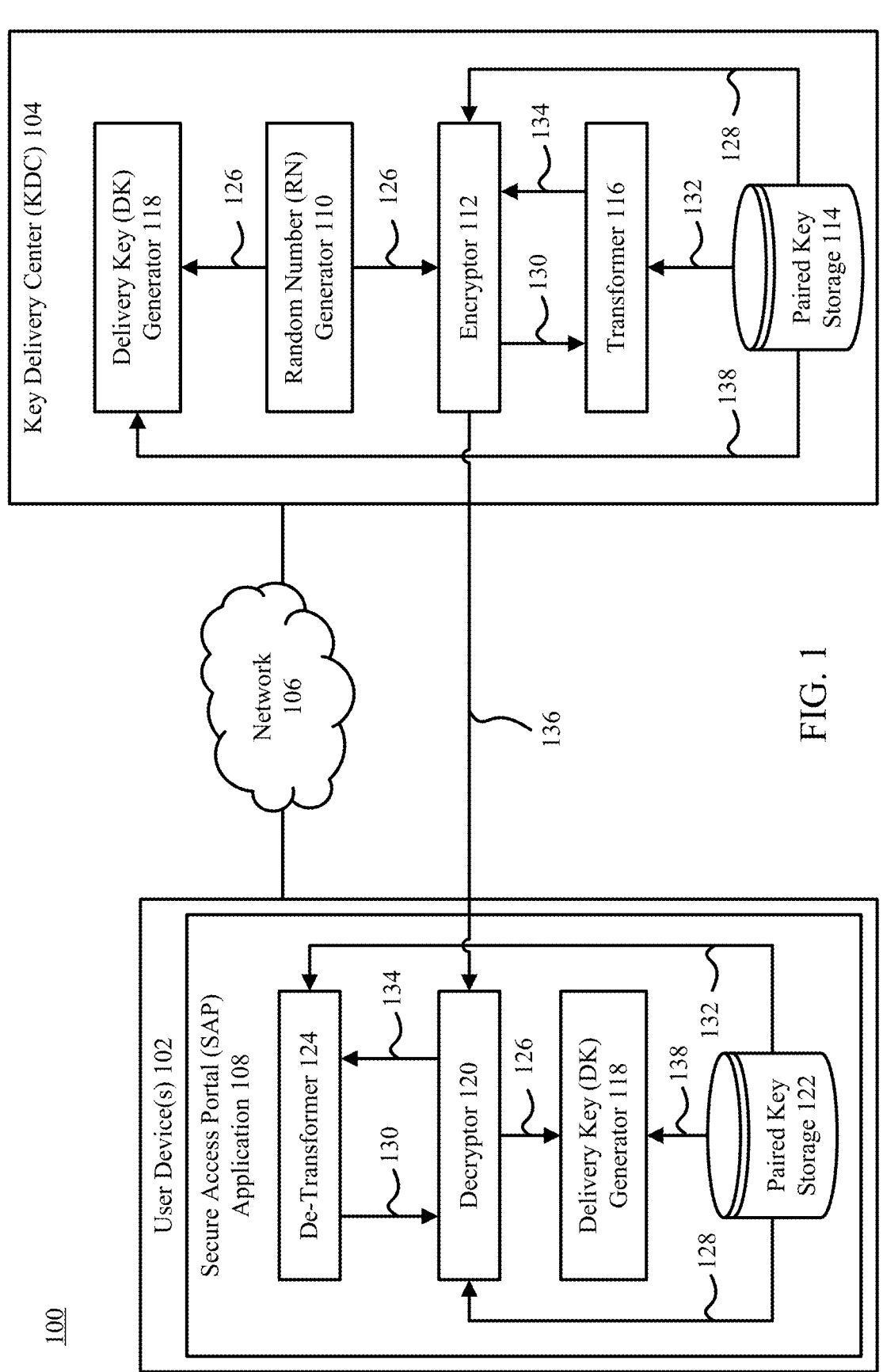
FIG. 1 shows a block diagram of an example system for providing a random number using a disguised cyphertext, in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The example embodiments described herein are provided for illustrative purposes and are not limiting. Further structural and operational embodiments, including modifications/alterations, will become apparent to persons skilled in the relevant art(s) from the teachings herein.

Typically, a sender sends a message (e.g., M) by encrypting it with a random number key (e.g., RNK) to obtain a cyphertext (e.g., $C=M\emptyset RNK$), and a receiver decrypts the cyphertext (e.g., $C=M\emptyset RNK$) using that same random number key (e.g., RNK) to obtain the original message (e.g., M). However, as a corollary to this, when both a sender and a receiver know the message (e.g., M), the sender can send a random number key (e.g., RNK), to the receiver by encrypting the random number key with the message to obtain a cyphertext (e.g., $C=RNK\emptyset M$), and the receiver can decrypt the cyphertext (e.g., $C=RNK\emptyset M$) using the known message (e.g., M) to obtain the random number key (e.g., RNK).

When the message (e.g., M) is a random number that meets the entropy criterion set forth above, this approach is considered to be ITS.

Embodiments disclosed herein are directed to providing random numbers over an insecure channel using disguised cyphertexts. In embodiments, disguised cyphertexts are generated based on paired keys shared by the sender and a receiver. For instance, a first set of paired keys is used in a reversible transformation or scramble function (e.g., T) to disguise a first cyphertext (e.g., $C1=M1\emptyset RNK1$) to obtain a first disguised cyphertext (e.g., $T(C1)=T(M1\emptyset RNK1)$). In embodiments, a second set of paired keys acts as a second known message (e.g., M2) used to encrypt and decrypt the disguised cyphertext (e.g., $T(C1)$). For instance, a sender encrypts a disguised cyphertext (e.g., $T(C1)$) using the second paired key (e.g., M2) to obtain a second cyphertext (e.g., $C2=M2\emptyset T(C1)$) and sends the second cyphertext to the receiver. In embodiments, a second random number key (e.g., RNK2) is sent in the same manner by encrypting the second random number key using a third paired key (e.g., M3) to obtain a third cyphertext (e.g., $C3=M3\emptyset RNK2$), transforming the third cyphertext using the transformation function (e.g., T) to obtain a second disguised cyphertext (e.g., $T(C3)=T(M3\emptyset RNK2)$), encrypting the second disguised cyphertext using a fourth paired key (e.g., M4) to obtain a fourth cyphertext (e.g., $C4=M4\emptyset T(C3)$).

In embodiments, a receiver decrypts the second and fourth cyphertexts (e.g., C2 and C4) using the second and fourth paired keys (e.g., M2 and M4) to obtain the first and second disguised cyphertexts (e.g., $T(C1)$ and $T(C3)$), de-transforms the first and second disguised cyphertexts (e.g., $T(C1)$ and $T(C3)$) using a reversed transformation or scramble function (e.g., $T_R$) to obtain the first and third cyphertexts (e.g., C1 and C3), and decrypts the first and third cyphertexts using the first and second paired keys (e.g., M1 and M3) to obtain the first and second random number keys (e.g., RNK1 and RNK2). In embodiments, the receiver uses the first and second random number keys (e.g., RNK1 and RNK2) to encrypt a message (e.g., M) to obtain a cyphertext message (e.g., $M\emptyset RNK1\emptyset RNK2$). If the message (e.g., M) becomes known through a known message attack, and the value of $RNK1\emptyset RNK2$ is revealed, the specific values of either random number key (e.g., RNK1 or RNK2) used to encrypt the message remains unknown, thus protecting the transformation or scramble function from being determined by a listener-in-the-middle, and making the cryptographic strength of the transformation function immaterial to the overall cryptographic strength of this approach.

In embodiments, a Key Distribution Center (KDC) employs disguised cyphertexts to distribute random number keys to secure access portal (SAP) applications executing on user endpoint devices. For instance, a KDC maintains paired keys for each SAP application based on a unique application random number ID (ARNID) associated with the SAP application. In embodiments, the KDC uses pre-paired keys that are deployed as part of an instantiation process of the SAP application to distribute additional paired keys to the SAP applications, and employs the paired keys to distribute new random numbers to the SAP applications. In embodiments, the KDC generates true random numbers by assembling true random bits generated by a Quantum Random Bit Generator (QRBG). In embodiments, the KDC generates a set of random numbers (e.g., RNK1 and RNK2), generates a delivery key (e.g., DK) based on the set of random numbers (e.g., $DK=RNK1\emptyset RNK2$), and distributes the set of random numbers to an SAP application using the disguised cyphertext technique discussed above. The SAP application, in embodiments, determines the set of random numbers (e.g., RNK1 and RNK2) using the disguised cyphertext technique discussed above, and generates the delivery key (e.g., DK) independently based on the set of random numbers (e.g., DK=RNK1ØRNK2). In embodiments, the KDC and SAP application employ the generated delivery key (e.g., DK) to securely deliver other information, such as, but not limited to, a symmetric key (e.g., SK) that may be used by the SAP application to securely communicate with other SAP applications. For instance, the KDC generates one or more delivery keys (e.g., DK1, DK2, .... DKN) that are used to respectively deliver a symmetric key (e.g., SK) to SAP applications of group of SAP applications upon their request to enable the SAP applications to securely communicate with each other using the symmetric key (e.g., SK).

In embodiments, SAP applications are downloaded from the KDC and installed onto user endpoint devices. In embodiments, each SAP application instance is associated with a unique ARNID that links the SAP application instance to paired keys maintained by both the SAP application instance and the KDC. For instance, paired keys are generated by the KDC and maintained by the KDC in association with the ARNID. In embodiments, the KDC maintains the paired keys within an ARNID files associated with a particular ARNID. To ensure perfect security, initial paired keys (e.g., pre-paired keys) cannot be sent over the internet, and are instead physically couriered or delivered by other secure physical means to newly-installed SAP applications then physically downloaded into the SAP application memory. In instances, the process of downloading the paired keys into an SAP application's memory may be referred to as "SAPtization," "SAPtizing," and/or "SAPtize." Once SAPtized, an SAP application is enabled to securely receive new keys (e.g., random numbers, random number keys (RNK), symmetric keys, etc.) from the KDC over an insecure communications channel (e.g., the Internet).

In embodiments, the KDC maintains three types of paired keys that are shared between the KDC and a corresponding SAP application, including, but not limited to, (i) pre-paired keys, (ii) foundational paired keys, and (iii) session paired keys. For instance, pre-paired keys are paired keys generated by the KDC for instantiation into a physical media to be physically delivered to the SAP application, including, but not limited to, a paired key nonce, an initial set of foundational paired keys associated with the paired key nonce, a file associated with the paired key nonce that includes block encrypted versions of the initial foundational paired keys, a lock key associated with the paired key nonce, and/or an initiation vector associated with the paired key nonce. Foundational paired keys, in embodiments, are used to derive session paired keys that are used in the delivery of random numbers from the KDC to the SAP. In embodiments, session paired keys are used only once.

In embodiments, the paired key nonce and the file containing the block encrypted versions of the initial foundational paired keys are physically delivered to the user endpoint device for instantiation in the SAP application. In instances, a user instantiates the SAP application with the paired key nonce and the file containing the block encrypted versions of the initial foundational paired keys in various ways, such as, but not limited to, by physically connecting the physical media to the user endpoint device, wirelessly connecting the physical media to the user endpoint device over a personal area network (PAN), transferring the paired key nonce and the file from the physical media to the user endpoint device, scanning a code (e.g., QR code, barcode, etc.) printed on the physical media using a camera of the user endpoint device, and/or the like. The SAP application, in embodiments, sends, to the KDC, the unique ARNID associated with the SAP application in cleartext along with a cyphertext of the paired key nonce encrypted using a public key associated with the KDC. The KDC, in embodiments, decrypts the cyphertext using its private key to obtain the paired key nonce, associates, at the KDC, the unique ARNID of the SAP application with the foundational paired keys associated with the paired key nonce, and sends, to the SAP application, a cyphertext containing the lock key and initiation vector associated with the paired key nonce encrypted using a public key associated with the SAP application. The SAP application, in embodiments, decrypts the cyphertext using its private key to obtain the lock key and the initiation vector, and uses the lock key and initiation vector to decrypt the file containing the block encrypted versions of the initial foundational paired keys. In embodiments, the initial foundational paired keys are refresh or replaced with foundational paired keys generated by the KDC and provided to the SAP application using delivery keys generated in the manner discussed above.

In embodiments, the initial foundational paired keys include, but are not limited to, a paired encryption key, a paired initiation vector nonce, and/or inputs for a transformation function. In embodiments, block encryption keys (e.g., BEK) are generated, by the KDC and/or the SAP applications, in CTR counter mode based on the paired encryption key and an initiation vector determined based on the paired initiation vector nonce and an incrementable counter value. For instance, additional block encryption keys (e.g., BEK1, BEK2, etc.) are generated by incrementing the counter value, and/or by replacing the paired encryption key and the paired initiation vector nonce.

In embodiments, block encryption keys are used to provide random numbers using disguised cyphertexts. For instance, a KDC creates two new two random numbers (e.g., RN1 and RN2), block encrypts the random numbers using block encryption keys (e.g., BEK1 and BEK2) to generate block encrypted random numbers (e.g., RN1ØBEK1 and RN2ØBEK2), transforms the block encrypted random numbers using a reversible transformation function (e.g., T) to obtained transformed numbers (e.g., TN1=T (RN1ØBEK1) and TN2=T (RN2ØBEK2). In embodiments, the block encryption keys (e.g., BEK1 and BEK2) include, but are not limited to, AES block encryption keys generated in CTR counter mode, block encryption keys generated using ChaCha20, and/or the like. In embodiments, the KDC sends the transformed numbers (e.g., TN1 and TN2) over an insecure channel as observable block encrypted cyphertexts to the SAP application. In embodiments, the SAP application decrypts the cyphertexts to obtain the transformed numbers (e.g., TN1 and TN2), de-transforms the transformed numbers using a reversed transformation function (e.g., $T_R$) to obtain the encrypted random numbers (e.g., RN1ØBEK1 and RN2ØBEK2), and decrypts the encrypted random numbers to obtain the original random numbers (e.g., RN1 and RN2). In embodiments, the KDC and the SAP application use the random numbers (e.g., RN1 and RN2) to create a delivery key (e.g., DK=RN1ØRN2). In embodiments, the KDC creates a new symmetric key (e.g., SK), and sends it to the SAP application as a cyphertext encrypted using the delivery key. In embodiments, the SAP application uses the delivery key (e.g., DK) and/or the symmetric key (e.g., SK) to securely communicate with other SAP application and/or with the KDC.

In a known message attack, a listener-in-the-middle that knows the message can determine the values of the symmetric keys and/or the delivery keys. Perfect forward security requires that this specific knowledge must not as well reveal the paired keys. The delivery key (e.g., DK=RN1ØRN2) above satisfies this requirement because it is a true Latin Square and someone knowing the value for delivery key (e.g., DK) cannot determine the specific random numbers (e.g., RN1 or RN2), transformed random numbers (e.g., TN1 or TN2), or block encryption keys (e.g., BEK1 or BEK2) used to generate the delivery key.

In embodiments, the transformation and/or de-transformation functions used by the KDC and/or SAP applications to transform and/or de-transform the encrypted random numbers include, but are not limited to, a bit rotation function, a block shuffle function, a square shuffle function, a cube shuffle function, and/or the like. For instance, when the transformation function is a bit function that transforms the encrypted random number (e.g., RN1ØBEK1 and RN2ØBEK2) by a number of bits determined based on a paired key input value, the corresponding de-transformation function is a bit function that transforms the transformed number (e.g., TN1 and TN2) by the same number of bits in the opposite direction or the opposite number of bits in the same direction.

In embodiments, a KDC delivers a symmetric directly to the SAP application using a transformation function and a random number transformation key that is provided by the KDC during SAPtization. For instance, a KDC generates a random number symmetric key (e.g., SKN), encrypts it using a block encryption key (e.g., BEK1) to obtain an encrypted symmetric key (e.g., SKE=SKNØBEK1), transforms the encrypted symmetric key (e.g., SKE) using a transformation function (e.g., T) based on a random number transformation index (e.g., key) to obtain a transformed encrypted symmetric key (e.g., T(SKNØBEK1, key), and encrypts the transformed encrypted symmetric key to obtain a disguised cyphertext (e.g., C=BEK2ØT(SKØBEK1, key). In embodiments, the SAP application decrypts the disguise cyphertext (e.g., C=BEK2ØT(SKNØBEK1, key) to obtain the transformed encrypted symmetric key (e.g., T(SKNØBEK1, key), de-transforms the transformed encrypted symmetric key using the transformation index (e.g., CSI) to obtain the encrypted symmetric key, and decrypts the encrypted symmetric key to obtain the random number symmetric key. In embodiments, the SAP application creates the symmetric key by folding the random number symmetric key, where an exclusive-or (XOR) operation is performed on the left half of the random number symmetric key and the inverse of the right half of the random number symmetric key.

In embodiments, the transformation function is a cube shuffle function (e.g., CS), where the value of the encrypted symmetric key (e.g., SKNØBEK1) is arranged in a cube and every point on a side of a cube is bit rotated into the direction perpendicular to the side according to a cube shuffle index (e.g., CSI) determined based on the random number cube shuffle key (e.g., CSK) provided by the KDC during SAP-tization. For instance, the cube shuffle index (e.g., CSI=CSKØBEK) is determined by performing an XOR operation using a block encryption key (e.g., BEK) and the cube shuffle key (e.g., CSK).

In embodiments, the transformation function is a random bit insertion function, where for every bit-1 value location in a block encryption key (e.g., BEK2), the bit value another block encryption key (e.g., BK3) is inserted at the bit location of the encrypted symmetric key (e.g., SKNØBEK1). The resulting n-bit word (e.g., RNI) is encrypted using another block encryption key (e.g., BEK4) to obtain a cyphertext (e.g., C=RNIØBEK4) that is sent to the SAP application. The SAP application decrypts the cyphertext to obtain the n-bit word (e.g., RNI), removes the inserted bits to obtain the encrypted symmetric key (e.g., SKNØBEK1), decrypts the encrypted symmetric key to obtain the random number symmetric key. In embodiments, the SAP application creates the symmetric key by folding the random number symmetric key, where the left half of the random number symmetric key is XORed with the inverse of the right half of the random number symmetric key.

In embodiments, the delivery key is a random number (e.g., RND1=PKRNaØBEK1) generated based on random number paired key (e.g., PKRNa) and a block encryption key (e.g., BEK1), where additional delivery keys (e.g., RND2, RND3, etc.) are generated based on the same random number paired key (e.g., PKRNa) and new block encryption keys (e.g., BEK2, BEK3, etc.) generated by incrementing a counter value. In embodiments, a KDC generates new paired key values (e.g., PKRNb, etc.) and provides the new paired key values by encrypting the new paired key values using a new delivery key. In embodiments, paired key values are replaced or refreshed after every symmetric key delivery session. In embodiments, the delivery key is generated based on block encryption keys generated using AES256 block encryption algorithm or based on true random numbers by generated by assembling true random bits generated by a QRBG.

In embodiments, a KDC and an SAP application perform an authentication process to prevent unauthorized access to the KDC and/or to prevent interacting with a malicious actor pretending to be the KDC. In embodiments, authentication is performed by calculating a value based on the next two block encryption keys (e.g., BEK1 and BEK2), providing the calculated value to the other party, and determining whether the values match. For instance, both the KDC and the SAP application calculate BEK1ØBEK2, and the SAP application sends its calculated value to the KDC to enable the KDC to authenticate the SAP application by comparing the SAP application's calculated value to its own calculated value. Similarly, both the KDC and SAP application calculate BEK3ØBEK4, and the KDC sends its calculated value to the SAP application to enable the SAP application to authenticate the KDC by comparing the KDC's calculated value to its own calculated value.

In the discussion above, the various values (e.g., paired keys, block encryption keys, symmetric keys, delivery keys, nonces etc.) are of fixed bit lengths, such as, but not limited to, 96-bit, 128-bit, 256-bit, 512-bit, and/or the like. In embodiments, the various values have the same and/or different bit lengths as other values.

These and further embodiments enable the functionality described above and additional functionality. Such embodiments are described in further detail as follows.

For example, FIG. 1 shows a block diagram of an example system 100 for providing a random number using a disguised cyphertext, in accordance with an embodiment. As shown in FIG. 1, system 100 includes one or more user devices 102 and a key delivery center (KDC) 104 that are communicatively coupled via a network 106. User device(s) 102 further include a secure access portal (SAP) application 108, and KDC 104 further includes a random number (RN) generator 110, an encryptor 112, a paired key storage 114, a transformer 116, and a delivery key (DK) generator 118. SAP application 108 further includes DK generator 118, a decryptor 120, a paired key storage 122, and a de-transformer 124. System 100 is described in further detail as follows.

User device(s) 102 comprise any computing device or plurality of computing devices suitable for performing functions that are ascribed thereto in the following description, as will be appreciated by persons skilled in the relevant art(s), including those mentioned elsewhere herein or otherwise known. Various example implementations of user device(s) 102 are described below in reference to FIG. 7 (e.g., computing device 702, and/or components thereof).

KDC 104 comprises any computing device or plurality of computing devices suitable for performing functions that are ascribed thereto in the following description, as will be appreciated by persons skilled in the relevant art(s), including those mentioned elsewhere herein or otherwise known. Various example implementations of KDC 104 are described below in reference to FIG. 7 (e.g., computing device 702, network-based server infrastructure 770, on-premises servers 792, and/or components thereof).

Network 106 comprises any computing device or plurality of computing devices suitable for performing functions that are ascribed thereto in the following description, as will be appreciated by persons skilled in the relevant art(s), including those mentioned elsewhere herein or otherwise known. Various example implementations of network 106 are described below in reference to FIG. 7 (e.g., network 704, and/or components thereof).

SAP application 108 comprises a downloadable application configured to securely receive random numbers (e.g., true random numbers, RN generator 110 comprises any computing device, plurality of computing devices and/or components thereof suitable for generating random numbers, as will be appreciated by persons skilled in the relevant art(s), including those mentioned elsewhere herein or otherwise known. In embodiments, RN generator 110 includes, but is not limited to, a QRNG that generates true random bits that may be assembled into a true random number, a pseudorandom number generator (PRNG), a deterministic random bit generator (DRBG), a cryptographically-secure PRNG (CSPRNG), and/or the like.

Encryptor 112 is configured to encrypt information (e.g., message, random number, symmetric key, etc.) using a key (e.g., random number, paired key, delivery key, symmetric key, block encryption key, etc.) to generate a cyphertext. In embodiments, encryptor 112 encrypts the information using the key by performing a reversible bitwise operation (e.g., an XOR operation) on the information to be encrypted and the key.

Paired key storage 114 is configured to store paired keys in association with unique ARNIDs of SAP applications 108. In embodiments, paired key storage 114 stores paired keys associated the unique ARNID of SAP application 108, such as, but not limited to, pre-paired keys provided by KDC 104 during SAPtization of SAP application 108, foundational paired keys provided by KDC 104 during and/or after SAPtization of SAP application 108, and/or session paired keys derived from foundational paired keys associated with the unique ARNID of SAP application 108 stored in paired key storage 114.

Transformer 116 is configured to perform a reversible one-way transformation on an input to generate a disguised or obfuscated output. In embodiments, transformer 116 transforms an encrypted random number 130 using a transformation function and outputs transformed cyphertext 134. In embodiments, the transformation function includes, but is not limited to, a bit rotation function, a block shuffle function, a square shuffle function, a cube shuffle function, and/or the like, that transforms encrypted random number 130 by a number of bits determined based on a paired key input value (e.g., paired key 132) to generate transformed cyphertext 134.

DK generator 118 is configured to generate a delivery key (DK) 206A and/or 206B based on one or more random numbers 126A and/or 126B, respectively, and one or more paired keys 138A and/or 138B, respectively. In embodiments, DK generator 118 generates DK 206A and/or 206B by performing an XOR operation on one or more random numbers 126A and/or 126B, respectively, and one or more paired keys 138A and/or 138B, respectively.

Decryptor 120 is configured to decrypt a cyphertext using a key (e.g., random number, paired key, delivery key, symmetric key, block encryption key, etc.) to obtain cleartext information (e.g., message, random number, symmetric key, etc.). In embodiments, decryptor 120 decrypts the cyphertext using the key by performing a reversible bitwise operation (e.g., an XOR operation) on the cyphertext and the key to obtain the cleartext information.

Paired key storage 122 stores paired keys associated the unique ARNID of SAP application 108. For instance, paired keys stored by paired key storage 122B includes, but are not limited to, pre-paired keys provided by KDC 104 during SAPtization of SAP application 108, foundational paired keys provided by KDC 104 during and/or after SAPtization of SAP application 108, and/or session paired keys derived from foundational paired keys stored in paired key storage 122.

De-transformer 124 is configured to perform a reversed one-way transformation on an input to generate a disguised or obfuscated output. In embodiments, de-transformer 124 de-transforms transformed cyphertext 134 using a reversed transformation function and outputs encrypted random number 130. In embodiments, the de-transformation function includes, but is not limited to, a bit rotation function, a block shuffle function, a square shuffle function, a cube shuffle function, and/or the like, that transforms the transformed cyphertext 134 by a number of bits determined based on a paired key input value (e.g., paired key 132) in the opposite direction as the transformation function employed by transformer 116 to obtain encrypted random number 130.

Figure 2A:
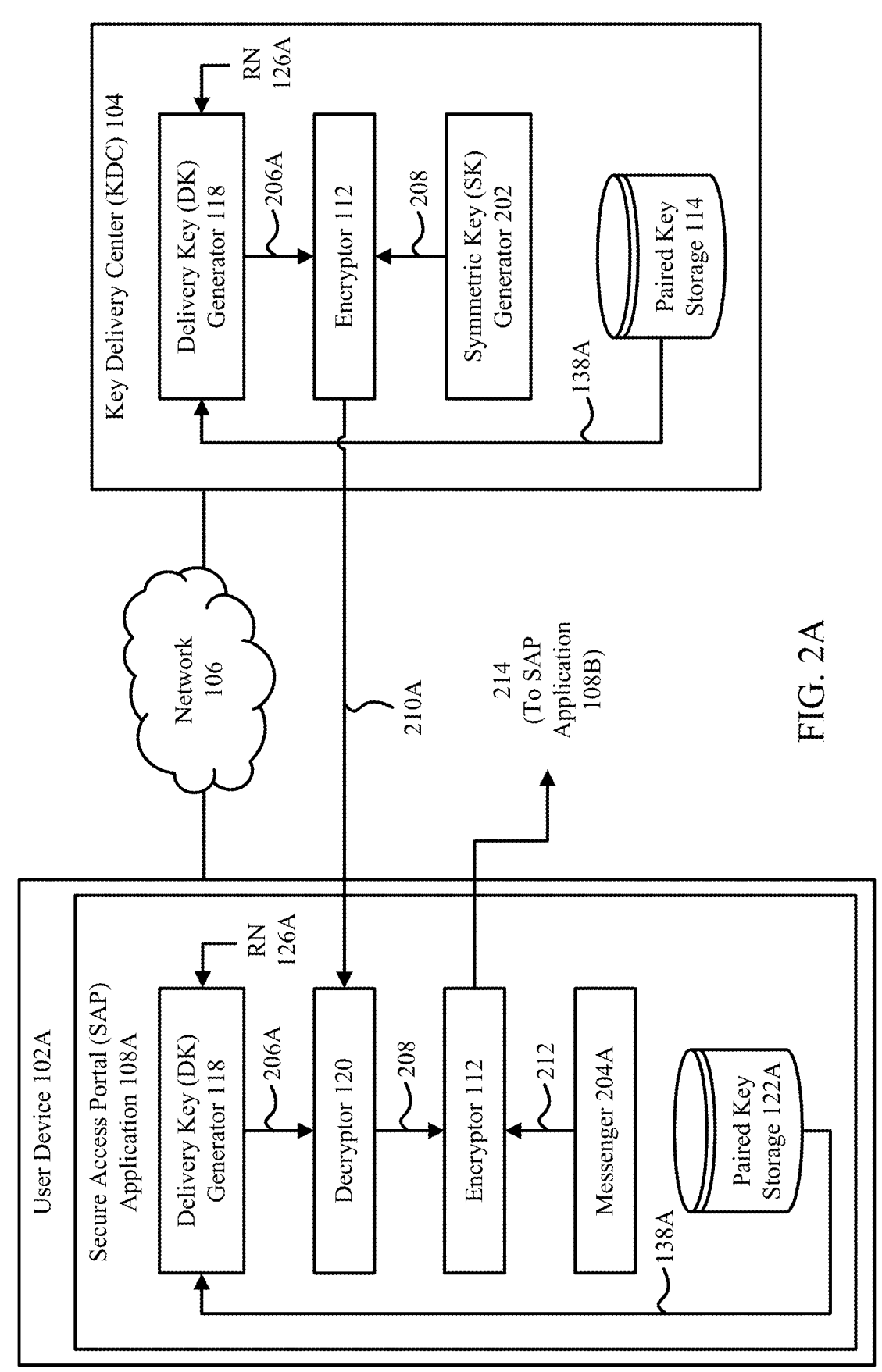
FIG. 2A shows a block diagram of an example system for communicating using a symmetric key delivered using a delivery key generated based on a random number delivered using a disguised cyphertext, in accordance with an embodiment.

Embodiments described herein may operate in various ways to communicate using a symmetric key delivered using a delivery key generated based on a random number delivered using a disguised cyphertext. For instance, FIG. 2A shows a block diagram of an example system 200A for communicating using a symmetric key delivered using a delivery key generated based on a random number delivered using a disguised cyphertext, in accordance with an embodiment. As shown in FIG. 2A, system 200A includes a user device 102A and KDC 104 that are communicatively coupled via network 106. User device 102A further includes SAP application 108A, and KDC 104 further includes encryptor 112, paired key storage 114, DK generator 118, and a symmetric key (SK) generator 202. SAP application 108A further includes encryptor 112, DK generator 118, decryptor 120, paired key storage 122A, and a messenger 204A. System 200A is described in further detail as follows.

User device 102A comprises any computing device or plurality of computing devices suitable for performing functions that are ascribed thereto in the following description, as will be appreciated by persons skilled in the relevant art(s), including those mentioned elsewhere herein or otherwise known. In embodiments, user device 102A comprises a particular user device of user device(s) 102 of FIG. 1. Various example implementations of user device 102A are described below in reference to FIG. 7 (e.g., computing device 702, and/or components thereof).

SAP application 108A comprises an instance of SAP application 108 of FIG. 1. In embodiments, SAP application 108A is associated with a unique ARNID, and stores, in paired key storage 122A, paired keys associated with the unique ARNID of SAP application 108A.

Paired key storage 122A comprises an instance of paired key storage 122 of FIG. 1. In embodiments, paired key storage 122A stores paired keys associated the unique ARNID of SAP application 108A. For instance, paired keys stored by paired key storage 122A includes, but are not limited to, pre-paired keys provided by KDC 104 during SAPtization of SAP application 108A, foundational paired keys provided by KDC 104 during and/or after SAPtization of SAP application 108A, and/or session paired keys derived from foundational paired keys stored in paired key storage 122A.

SK generator 202 is configured to generate one or more symmetric keys (SK) 208 that enable secure communication between parties in possession of SK 208 (e.g., between instances of SAP applications 108). In embodiments, SK 208 comprises a random number generated by KDC 104 (e.g., by RN generator 110 of FIG. 1).

Messenger 204A comprises any component suitable for performing functions that are ascribed thereto in the following description, as will be appreciated by persons skilled in the relevant art(s), including those mentioned elsewhere herein or otherwise known. In embodiments, messenger 204A comprises a user interface (not shown) that enables communications between users of user device(s) 102. In embodiments, messenger 204A comprises an interface that enables communications between other components (not shown) of user device(s) 102. For instance, messenger 204A may include an application program interface (API) that enables other components (e.g., applications, etc.) of user device 102A to communicate corresponding components (e.g., applications, etc.) of other user device(s) 102 (e.g., user device 102B of FIG. 2B). In embodiment, messenger 204A provides a message 212 to encryptor 112 for encryption and transmission to another SAP application 108 (e.g., SAP application 108B of FIG. 2B).

As shown in FIG. 2A, DK generator 118 on both user device 102A and KDC 104 generates a delivery key (DK) 206A based on a random number (RN) 126A and one or more paired keys 138A associated with the unique ARNID of SAP application 108A. In embodiments, encryptor 112 of KDC 104 encrypts SK 208 generated by SK generator 202 using DK 206A to generate cyphertext 210A, and provides cyphertext 210A to decryptor 120 of SAP application 108A. In embodiments, decryptor 120 of SAP application 108A decrypts cyphertext 210A using DK 206A to obtain SK 208, and encryptor 112 of SAP application 108A encrypts message 212 using SK 208 to generate an encrypted message 214, and provides encrypted message 214 to another SAP application 108 (e.g., SAP application 108B of FIG. 2B).

Figure 2B:
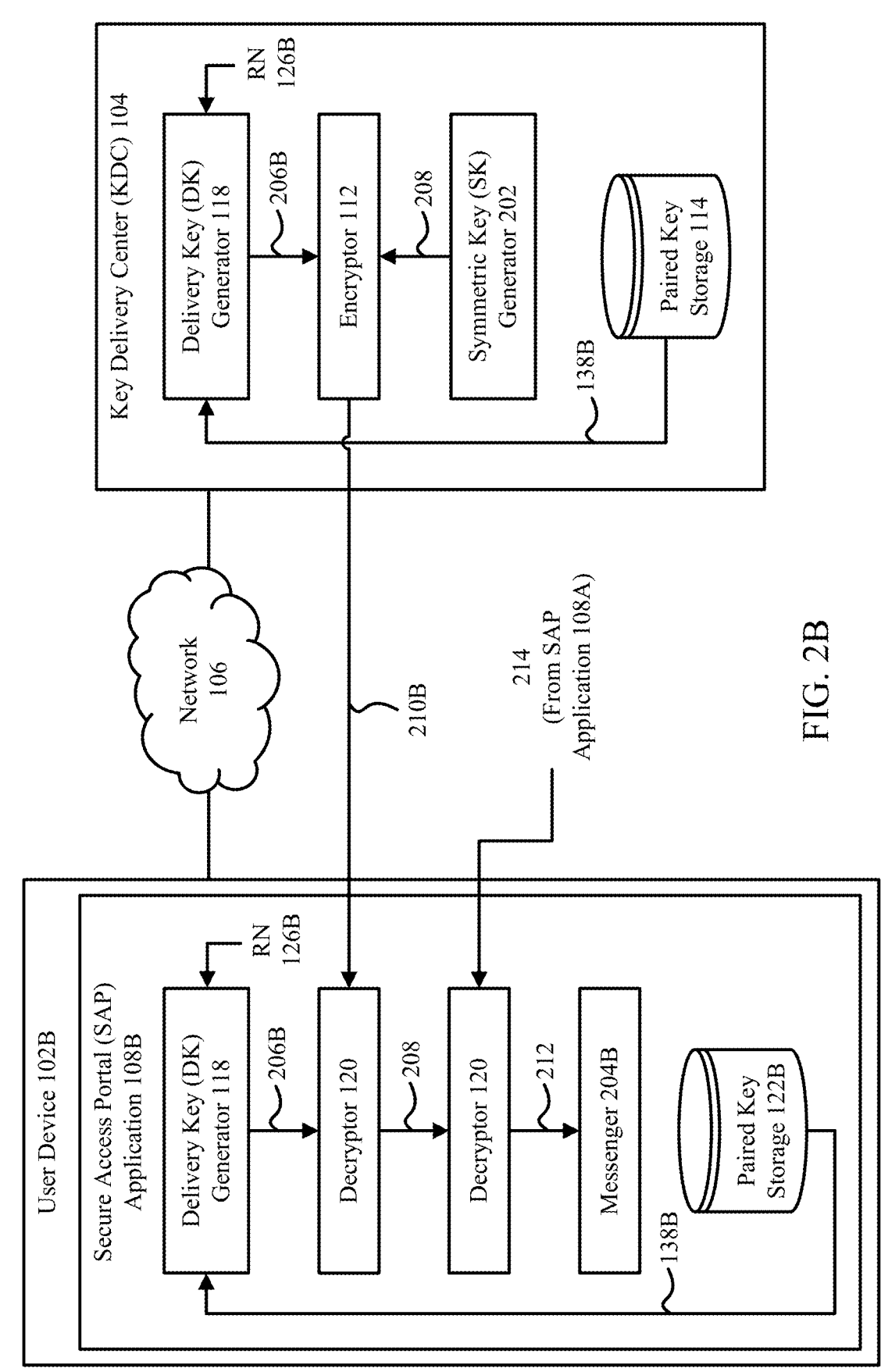
FIG. 2B shows a block diagram of an example system for communicating using a symmetric key delivered using a delivery key generated based on a random number delivered using a disguised cyphertext, in accordance with an embodiment.

Embodiments described herein may operate in various ways to communicate using a symmetric key delivered using a delivery key generated based on a random number delivered using a disguised cyphertext. For instance, FIG. 2B shows a block diagram of an example system 200B for communicating using a symmetric key delivered using a delivery key generated based on a random number delivered using a disguised cyphertext, in accordance with an embodiment. As shown in FIG. 2B, system 200B includes a user device 102B and KDC 104 that are communicatively coupled via network 106. User device 102B further includes SAP application 108B, and KDC 104 further includes encryptor 112, paired key storage 114, DK generator 118, and SK generator 202. SAP application 108B further includes DK generator 118, decryptor 120, paired key storage 122B, and a messenger 204B. System 200A is described in further detail as follows.

User device 102B comprises any computing device or plurality of computing devices suitable for performing functions that are ascribed thereto in the following description, as will be appreciated by persons skilled in the relevant art(s), including those mentioned elsewhere herein or otherwise known. In embodiments, user device 102B comprises a particular user device of user device(s) 102 of FIG. 1. Various example implementations of user device 102B are described below in reference to FIG. 7 (e.g., computing device 702, and/or components thereof).

SAP application 108B comprises an instance of SAP application 108 of FIG. 1. In embodiments, SAP application 108B is associated with a unique ARNID, and stores, in paired key storage 122B, paired keys associated with the unique ARNID of SAP application 108B.

Paired key storage 122B comprises an instance of paired key storage 122 of FIG. 1. In embodiments, paired key storage 122B stores paired keys associated the unique ARNID of SAP application 108B. For instance, paired keys stored by paired key storage 122B includes, but are not limited to, pre-paired keys provided by KDC 104 during SAPtization of SAP application 108B, foundational paired keys provided by KDC 104 during and/or after SAPtization of SAP application 108B, and/or session paired keys derived from foundational paired keys stored in paired key storage 122B.

Messenger 204B comprises any component suitable for performing functions that are ascribed thereto in the following description, as will be appreciated by persons skilled in the relevant art(s), including those mentioned elsewhere herein or otherwise known. In embodiments, messenger 204B comprises a user interface (not shown) that enables communications between users of user device(s) 102. In embodiments, messenger 204B comprises an interface that enables communications between other components (not shown) of user device(s) 102. For instance, messenger 204B may include an application program interface (API) that enables other components (e.g., applications, etc.) of user device 102B to communicate corresponding components (e.g., applications, etc.) of another user device 102 (e.g., user device 102A of FIG. 2A). In embodiment, messenger 204B receives a message 212 from decryptor 120.

As shown in FIG. 2B, DK generator 118 on both user device 102B and KDC 104 generates a DK 206B based on RN 126B and one or more paired keys 138B associated with the unique ARNID of SAP application 108B. In embodiments, encryptor 112 of KDC 104 encrypts SK 208 generated by SK generator 202 using DK 206B to generate cyphertext 210B, and provides cyphertext 210B to decryptor 120 of SAP application 108B. In embodiments, decryptor 120 of SAP application 108B decrypts cyphertext 210B using DK 206B to obtain SK 208, receives encrypted message 214 from another SAP application (e.g., SAP application 108A of FIG. 2A), decrypts encrypted message 214 using SK 208 to obtain message 212, and provides message 212 to messenger 204B of SAP application 108B.

Embodiments described herein may operate in various ways to receive a random number using a disguised cyphertext. For instance, FIG. 3 depicts a flowchart 300 of a process for receiving a random number using a disguised cyphertext, in accordance with an embodiment. SAP application 108, DK generator 118, decryptor 120, paired key storage 122, and/or de-transformer 124 may, for example, operate according to flowchart 300. Note that not all steps of flowchart 300 may need to be performed in all embodiments, and in some embodiments, the steps of flowchart 300 may be performed in different orders than shown. Flowchart 300 is described as follows with respect to FIG. 1 for illustrative purposes.

Flowchart 300 starts at step 302. In step 302, a first SAP application receives a first cyphertext from a KDC. For instance, decryptor 120 of SAP application 108 receives cyphertext 136 from KDC 104.

In step 304, the first SAP application decrypts the first cyphertext using paired keys shared between the first SAP application and the KDC to obtain a transformed second cyphertext. For instance, decryptor 120 of SAP application 108 decrypts cyphertext 136 using one or more paired key(s) 128 to obtain transformed cyphertext 134.

In step 306, the first SAP application de-transforms the transformed second cyphertext using a transformation function based on the paired keys to obtain a second cyphertext. For instance, de-transformer 124 de-transforms transformed cyphertext 134 based on paired key 132 to obtain encrypted random number 130.

In step 308, the first SAP application decrypts the second cyphertext using the paired keys to obtain a first random number generated by the KDC. For instance, decryptor 120 of SAP application 108 decrypts encrypted random number 130 using paired key(s) 128 to obtain RN 126 that was generated by RN generator 110 of KDC 104.

In step 310, the first SAP application generates a delivery key based at least on the first random number. For instance, DK generator 118 of SAP application 108 generates a delivery key based on RN 126 and one or more paired keys 138. In embodiments, DK generator 118 of SAP application 108 generates a delivery key according to the steps of flowchart 500, which will be described in greater detail below in conjunction with FIG. 5.

Embodiments described herein may operate in various ways to provide a random number using a disguised cyphertext. For instance, FIG. 4 depicts a flowchart 400 of a process for providing a random number using a disguised cyphertext, in accordance with an embodiment. KDC 104, RN generator 110, encryptor 112, paired key storage 114, transformer 116, and/or DK generator 118 may, for example, operate according to flowchart 400. Note that not all steps of flowchart 400 may need to be performed in all embodiments, and in some embodiments, the steps of flowchart 400 may be performed in different orders than shown. Flowchart 400 is described as follows with respect to FIG. 1 for illustrative purposes.

Flowchart 400 starts at step 402. In step 402, a KDC generates a first random number. For instance, RN generator 110 generates RN 126.

In step 404, the KDC encrypts the first random number using paired keys shared between a first SAP application and the KDC to obtain a first cyphertext. For instance, encryptor 112 of KDC 104 encrypts RN 126 using paired key(s) 128 to obtain encrypted random number 130.

In step 406, the KDC transforms the first cyphertext using a transformation function based on the paired keys to obtain a transformed first cyphertext. For instance, transformer 116 transforms encrypted random number 130 based on paired key 132 to obtain transformed cyphertext 134

In step 408, the KDC encrypts the transformed first cyphertext using the paired keys to obtain a second cyphertext. For instance, encryptor 112 of KDC 104 encrypts transformed cyphertext 134 using paired key(s) 128 to obtain cyphertext 136.

In step 410, the KDC transmits the second cyphertext to the first SAP application. For instance, encryptor 112 of KDC 104 transmits cyphertext 136 to SAP application 108.

Embodiments described herein may operate in various ways to determine a delivery key from a random number. For instance, FIG. 5 depicts a flowchart 500 of a process for determining a delivery key based on a random number, in accordance with an embodiment. DK generator 118, may, for example, operate according to flowchart 500. Flowchart 500 is described as follows with respect to FIGS. 1, 2A, and/or 2B for illustrative purposes.

Flowchart 500 starts at step 502. In step 502, an XOR operation is performed on the first random number and a second random number generated by the KDC. For instance, DK 118 of user device(s) 102, 102A and/or 102B and/or KDC 104 generates DK 206A and/or 206B by performing an XOR operation on two or more RNs 126, 126A, and/or 126B.

Embodiments described herein may operate in various ways to communicate using a symmetric key delivered using a delivery key. FIG. 6A depicts a flowchart 600 of a process for communicating using a symmetric key delivered using a delivery key, in accordance with an embodiment. SAP application 108A, encryptor 112, DK generator 118, decryptor 120, paired key storage 122A, and/or messenger 204A may, for example, operate according to flowchart 600. Note that not all steps of flowchart 600 may need to be performed in all embodiments, and in some embodiments, the steps of flowchart 600 may be performed in different orders than shown. Flowchart 600 is described as follows with respect to FIGS. 1, and/or 2A for illustrative purposes.

Flowchart 600 starts at step 602. In step 602, a first SAP application receives a third cyphertext from a KDC. For instance, decryptor 120 of SAP application 108A receives cyphertext 210A from KDC 104.

In step 604, the first SAP application decrypts the third cyphertext using a delivery key to obtain a symmetric key. For instance, decryptor 120 of SAP application 108A decrypts cyphertext 210A using delivery key 206A to obtain a symmetric key (SK) 208.

In step 606, the first SAP application encrypts a message using the symmetric key to obtain an encrypted message. For instance, encryptor 112 encrypts message 212 from messenger 204A using SK 208 to obtain encrypted message 214.

In step 608, the first SAP application transmits the encrypted message to a second SAP application. For instance, encryptor 112 of SAP application 108A transmits encrypted message 214 to another SAP application (e.g., SAP application 108B of FIG. 2B).

Embodiments described herein may operate in various ways to communicate using a symmetric key delivered using a delivery key. FIG. 6B depicts a flowchart 610 of a process for communicating using a symmetric key delivered using a delivery key, in accordance with an embodiment. SAP application 108B, DK generator 118, decryptor 120, paired key storage 122B, and/or messenger 204B may, for example, operate according to flowchart 610. Note that not all steps of flowchart 610 may need to be performed in all embodiments, and in some embodiments, the steps of flowchart 610 may be performed in different orders than shown. Flowchart 610 is described as follows with respect to FIGS. 1, and/or 2B for illustrative purposes.

Flowchart 610 starts at step 612. In step 612, a first SAP application receives a third cyphertext from a KDC. For instance, decryptor 120 of SAP application 108A receives cyphertext 210B from KDC 104.

In step 614, the first SAP application decrypts the third cyphertext using a delivery key to obtain a symmetric key. For instance, decryptor 120 of SAP application 108A decrypts cyphertext 210B using delivery key 206A to obtain SK 208.

In step 616, the first SAP application receives a cyphertext message from a second SAP application. For instance, decryptor 120 of SAP application 108B receives encrypted message 214 from another SAP application (e.g., SAP application 108A of FIG. 2A)

In step 618, the first SAP application decrypts the cyphertext message using the symmetric key to obtain a cleartext message. For instance, decryptor 120 of SAP application 108B decrypts encrypted message 214 using SK 208 to obtain message 212.

Embodiments described herein may operate in various ways to provide a symmetric key by encrypting it using a delivery key. FIG. 6C depicts a flowchart 620 of a process for providing a symmetric key by encrypting it using a delivery key, in accordance with an embodiment. KDC 104, encryptor 112, paired key storage 114, DK generator 118, and/or SK generator 202 may, for example, operate according to flowchart 620. Note that not all steps of flowchart 620 may need to be performed in all embodiments, and in some embodiments, the steps of flowchart 620 may be performed in different orders than shown. Flowchart 620 is described as follows with respect to FIGS. 1, 2A, and/or 2B for illustrative purposes.

Flowchart 620 starts at step 622. In step 622, a KDC generates a delivery key based on a random number and paired keys shared between a first SAP application and the KDC. For instance, DK 118 of KDC 104 generates DK 206A and/or DK 206B based on RN 126A and/or 126B, respectively, and paired key(s) 138A and/or 138B, respectively.

In step 624, the KDC generates a symmetric key configured to enable secure communications between the first SAP application and other SAP applications. For instance, SK generator 202 generates SK 208. In embodiments, SK 208 comprises a random number generated by KDC 104 (e.g., by RN generator 110 of FIG. 1).

In step 626, the KDC encrypts the symmetric key using the delivery key to generates an encrypted symmetric key. For instance, encryptor 112 of KDC 104 encrypts SK 208 using DK 206A and/or DK 206B to obtain cyphertexts 210A and/or 210B, respectively.

In step 628, the KDC transmits the encrypted symmetric key to the first SAP application. For instance, encryptor 112 of KDC 104 transmits cyphertexts 210A and/or 210B to SAP application 108A and/or SAP application 108B, respectively.

III. Example Computer System Implementation

The components of systems 100, 200A, and 200B of FIGS. 1, 2A, and 2B, respectively, the steps of the flowcharts of FIGS. 3-5, and 6A-6B may each be implemented in hardware, or hardware combined with one or both of software and/or firmware. For example, the components of systems 100, 200A, and 200B of FIGS. 1, 2A, and 2B, respectively, the steps of the flowcharts of FIGS. 3-5, and 6A-6B may each be implemented as computer program code/instructions configured to be executed in one or more processors and stored in a computer readable storage medium. Alternatively, the components of systems 100, 200A, and 200B of FIGS. 1, 2A, and 2B, respectively, the steps of the flowcharts of FIGS. 3-5, and 6A-6B may each be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
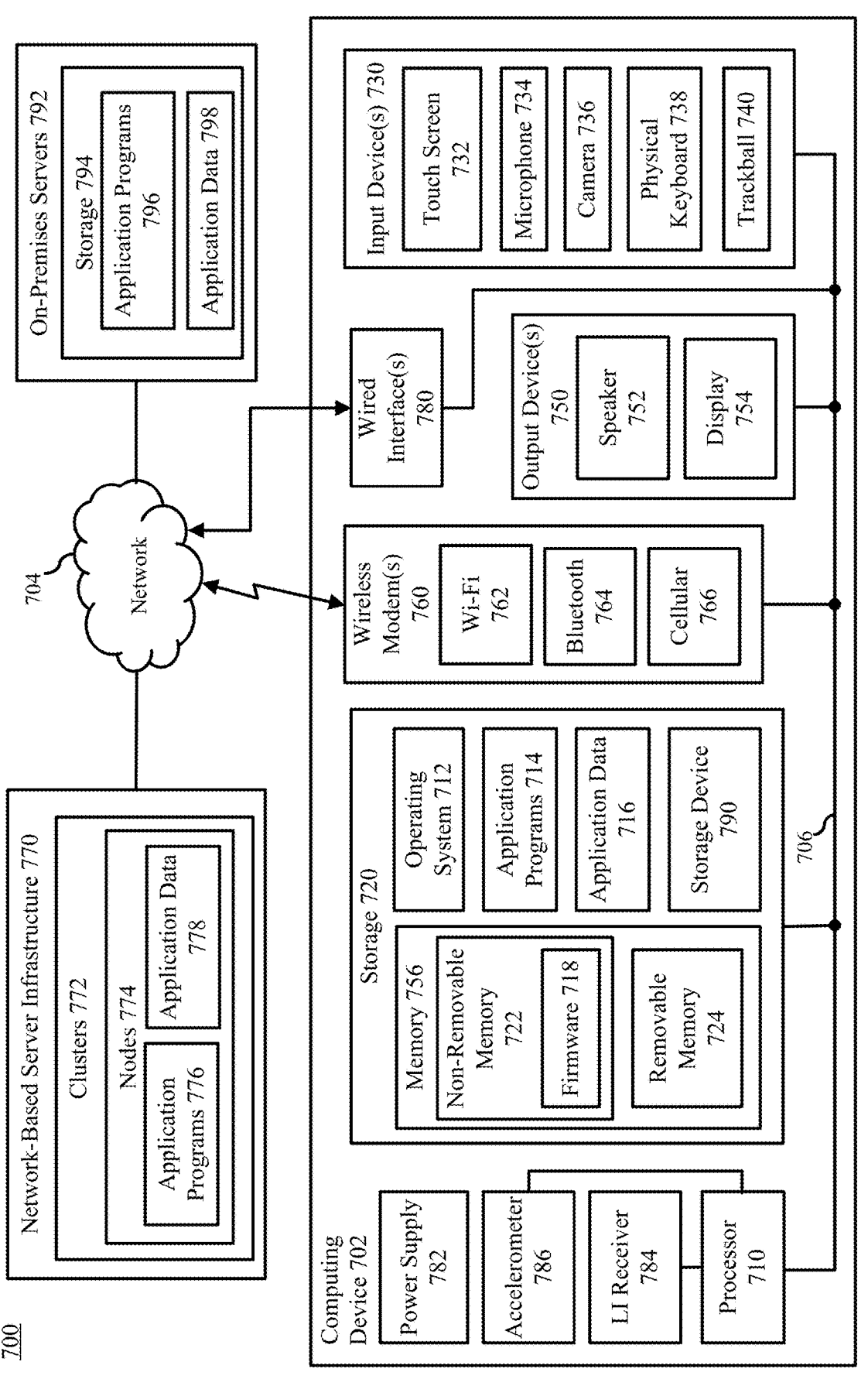
FIG. 7 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 7. FIG. 7 shows a block diagram of an exemplary computing environment 700 that includes a computing device 702. In some embodiments, computing device 702 is communicatively coupled with devices (not shown in FIG. 7) external to computing environment 700 via a network 704. Network 704 comprises one or more networks such as local area networks (LANs), wide area networks (WANs), enterprise networks, the Internet, etc., and may include one or more wired and/or wireless portions. Network 704 may additionally or alternatively include a cellular network for cellular communications. Computing device 702 is described in detail as follows.

Computing device 702 can be any of a variety of types of computing devices. For example, computing device 702 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 702 may alternatively be a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, one or more input devices 730, one or more output devices 750, one or more wireless modems 760, one or more wired interface(s) 780, a power supply 782, a location information (LI) receiver 784, and an accelerometer 786. Storage 720 includes memory 756, which includes non-removable memory 722 and removable memory 724, and a storage device 790. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device(s) 730 includes a touch screen 732, a microphone 734, a camera 736, a physical keyboard 738, and a trackball 740. Not all components of computing device 702 shown in FIG. 7 are present in all embodiments, additional components not shown may be present, and any combination of the components may be present in a particular embodiment. These components of computing device 702 are described as follows.

A single processor 710 (e.g., central processing unit (CPU), microcontroller, a microprocessor, signal processor, ASIC (application specific integrated circuit), and/or other physical hardware processor circuit) or multiple processors 710 may be present in computing device 702 for performing such tasks as program execution, signal coding, data processing, input/output processing, power control, and/or other functions. Processor 710 may be a single-core or multi-core processor, and each processor core may be single-threaded or multithreaded (to provide multiple threads of execution concurrently). Processor 710 is configured to execute program code stored in a computer readable medium, such as program code of operating system 712 and application programs 714 stored in storage 720. Operating system 712 controls the allocation and usage of the components of computing device 702 and provides support for one or more application programs 714 (also referred to as "applications" or "apps"). Application programs 714 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 702 can communicate with any other component according to function, although not all connections are shown for case of illustration. For instance, as shown in FIG. 7, bus 706 is a multiple signal line communication medium (e.g., conductive traces in silicon, metal traces along a motherboard, wires, etc.) that may be present to communicatively couple processor 710 to various other components of computing device 702, although in other embodiments, an alternative bus, further buses, and/or one or more individual signal lines may be present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 790, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 722 may include main memory and may be separate from or fabricated in a same integrated circuit as processor 710. As shown in FIG. 7, non-removable memory 722 stores firmware 718, which may be present to provide low-level control of hardware. Examples of firmware 718 include BIOS (Basic Input/Output System, such as on personal computers) and boot firmware (e.g., on smart phones). Removable memory 724 may be inserted into a receptacle of or otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 790 may be present that are internal and/or external to a housing of computing device 702 and may or may not be removable. Examples of storage device 790 include a hard disk drive, a SSD, a thumb drive (e.g., a USB (Universal Serial Bus) flash drive), or other physical storage device.

One or more programs may be stored in storage 720. Such programs include operating system 712, one or more application programs 714, and other program modules and program data. Examples of such application programs may include, for example, computer program logic (e.g., computer program code/instructions) for implementing one or more of KDC 104, SAP application(s) 108A-108B, RN generator 110, encryptor 112, paired key storage 114, transformer 116, DK generator 118, decryptor 120, paired key storage(s) 122A-122B, de-transformer 124, SK generator 202, messenger 204, as well as any of the steps of the flowcharts of FIGS. 3-5 and/or 6A-6B.

Storage 720 also stores data used and/or generated by operating system 712 and application programs 714 as application data 716. Examples of application data 716 include web pages, text, images, tables, sound files, video data, and other data, which may also be sent to and/or received from one or more network servers or other devices via one or more wired or wireless networks. Storage 720 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 702 through one or more input devices 730 and may receive information from computing device 702 through one or more output devices 750. Input device(s) 730 may include one or more of touch screen 732, microphone 734, camera 736, physical keyboard 738 and/or trackball 740 and output device(s) 750 may include one or more of speaker 752 and display 754. Each of input device(s) 730 and output device(s) 750 may be integral to computing device 702 (e.g., built into a housing of computing device 702) or external to computing device 702 (e.g., communicatively coupled wired or wirelessly to computing device 702 via wired interface(s) 780 and/or wireless modem(s) 760). Further input devices 730 (not shown) can include a Natural UI (NUI), a pointing device (computer mouse), a joystick, a video game controller, a scanner, a touch pad, a stylus pen, a voice recognition system to receive voice input, a gesture recognition system to receive gesture input, or the like. Other output devices (not shown) can include piezoelectric or other haptic output devices. Some devices can serve more than one input/output function. For instance, display 754 may display information, as well as operating as touch screen 732 by receiving user commands and/or other information (e.g., by touch, finger gestures, virtual keyboard, etc.) as a UI. Any number of each type of input device(s) 730 and output device(s) 750 may be present, including multiple microphones 734, multiple cameras 736, multiple speakers 752, and/or multiple displays 754.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). Wireless modem 760 may also or alternatively include other radio-based modem types, such as a Bluetooth modem 764 (also referred to as a "Bluetooth device") and/or Wi-Fi 762 modem (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and may receive power from a battery internal to computing device 702, and/or from a power cord plugged into a power port of computing device 702 (e.g., a USB port, an A/C power port). LI receiver 784 may be used for location determination of computing device 702 and may include a satellite navigation receiver such as a Global Positioning System (GPS) receiver or may include other type of location determiner configured to determine location of computing device 702 based on received information (e.g., using cell tower triangulation, etc.). Accelerometer 786 may be present to determine an orientation of computing device 702.

Note that the illustrated components of computing device 702 are not required or all-inclusive, and fewer or greater numbers of components may be present as would be recognized by one skilled in the art. For example, computing device 702 may also include one or more of a gyroscope, barometer, proximity sensor, ambient light sensor, digital compass, etc. Processor 710 and memory 756 may be co-located in a same semiconductor device package, such as being included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein may be stored in storage 720 and executed by processor 710.

In some embodiments, server infrastructure 770 may be present in computing environment 700 and may be communicatively coupled with computing device 702 via network 704. Server infrastructure 770, when present, may be a network-accessible server set (e.g., a cloud-based environment or platform). As shown in FIG. 7, server infrastructure 770 includes clusters 772. Each of clusters 772 may comprise a group of one or more compute nodes and/or a group of one or more storage nodes. For example, as shown in FIG. 7, cluster 772 includes nodes 774. Each of nodes 774 are accessible via network 704 (e.g., in a "cloud-based" embodiment) to build, deploy, and manage applications and services. Any of nodes 774 may be a storage node that comprises a plurality of physical storage disks, SSDs, and/or other physical storage devices that are accessible via network 704 and are configured to store data associated with the applications and services managed by nodes 774. For example, as shown in FIG. 7, nodes 774 may store application data 778.

Each of nodes 774 may, as a compute node, comprise one or more server computers, server systems, and/or computing devices. For instance, a node 774 may include one or more of the components of computing device 702 disclosed herein. Each of nodes 774 may be configured to execute one or more software applications (or "applications") and/or services and/or manage hardware resources (e.g., processors, memory, etc.), which may be utilized by users (e.g., customers) of the network-accessible server set. For example, as shown in FIG. 7, nodes 774 may operate application programs 776. In an implementation, a node of nodes 774 may operate or comprise one or more virtual machines, with each virtual machine emulating a system architecture (e.g., an operating system), in an isolated manner, upon which applications such as application programs 776 may be executed.

In an embodiment, one or more of clusters 772 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 772 may be a datacenter in a distributed collection of datacenters. In embodiments, exemplary computing environment 700 comprises part of a cloud-based platform such as Amazon Web Services® of Amazon Web Services, Inc. or Google Cloud Platform™ of Google LLC, although these are only examples and are not intended to be limiting.

In an embodiment, computing device 702 may access application programs 776 for execution in any manner, such as by a client application and/or a browser at computing device 702. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 702 may additionally and/or alternatively synchronize copies of application programs 714 and/or application data 716 to be stored at network-based server infrastructure 770 as application programs 776 and/or application data 778. For instance, operating system 712 and/or application programs 714 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 720 at network-based server infrastructure 770.

In some embodiments, on-premises servers 792 may be present in computing environment 700 and may be communicatively coupled with computing device 702 via network 704. On-premises servers 792, when present, are hosted within an organization's infrastructure and, in many cases, physically onsite of a facility of that organization. On-premises servers 792 are controlled, administered, and maintained by IT (Information Technology) personnel of the organization or an IT partner to the organization. Application data 798 may be shared by on-premises servers 792 between computing devices of the organization, including computing device 702 (when part of an organization) through a local network of the organization, and/or through further networks accessible to the organization (including the Internet). Furthermore, on-premises servers 792 may serve applications such as application programs 796 to the computing devices of the organization, including computing device 702. Accordingly, on-premises servers 792 may include storage 794 (which includes one or more physical storage devices such as storage disks and/or SSDs) for storage of application programs 796 and application data 798 and may include one or more processors for execution of application programs 796. Still further, computing device 702 may be configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 may be used to implement systems, clients, or devices, or components/subcomponents thereof, disclosed elsewhere herein. In other embodiments, a combination of computing device 702, network-based server infrastructure 770, and/or on-premises servers 792 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 820. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 714) may be stored in storage 720. Such computer programs may also be received via wired interface(s) 780 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments but should be defined only in accordance with the following claims and their equivalents.

What is claimed is:

1. A system comprising:
a processor; and
a memory device that stores program structured to cause the processor to:
  receive, by a first secure access portal (SAP) application, a first cyphertext from a key deliver center (KDC);
  decrypt, by the first SAP application, the first cyphertext using paired keys shared between the first SAP application and the KDC to obtain a transformed second cyphertext;
  de-transform, by the first SAP application, the transformed second cyphertext using a transformation function based on the paired keys to obtain a second cyphertext;
  decrypt, by the first SAP application, the second cyphertext using the paired keys to obtain first a random number generated by the KDC; and
  generate, by the first SAP application, a delivery key based at least on the first random number.

2. The system of claim 1, wherein the program code is structured to further cause the processor to:
  receive, by the first SAP application, a third cyphertext from the KDC;
  decrypt, by the first SAP application, the third cyphertext using the delivery key to obtain a symmetric key;
  encrypt, by the first SAP application, a message using the symmetric key to obtain an encrypted message; and
  transmit, by the first SAP application, the encrypted message to a second SAP application.

3. The system of claim 1, wherein the program code is structured to further cause the processor to:
  receive, by the first SAP application, a third cyphertext from the KDC;
  decrypt, by the first SAP application, the third cyphertext using the delivery key to obtain a symmetric key;
  receive, by the first SAP application, a cyphertext message from a second SAP application; and
  decrypt, by the first SAP application, the cyphertext message using the symmetric key to obtain a cleartext message.

4. The system of claim 1, wherein, to generate the delivery key, the program code is structured to further cause the processor to:

perform an exclusive-or (XOR) operation on the first random number and a second random number generated by the KDC.

5. The system of claim 1, wherein the paired keys comprise at least one of:

pre-paired keys;

a paired encryption key;

a paired initiation vector nonce; or an input for the transformation function.

6. The system of claim 1, wherein the transformation function comprises at least one of:

a bit rotation function where the number of bits rotated are based on the paired keys;

a block shuffle function where the number of bits shuffled are based on the paired keys;

a square shuffle function where the number of bits shuffled are based on the paired keys; or a cube shuffle function where the number of bits shuffled are based on the paired keys.

7. The system of claim 1, wherein, to receive the first cyphertext from the KDC, the program code is structured to cause the processor to:

receive the first cyphertext from the KDC over an insecure channel subject to eavesdropping.

8. A method comprising:

receiving, by a first secure access portal (SAP) application, a first cyphertext from a key deliver center (KDC);

decrypting, by the first SAP application, the first cyphertext using paired keys shared between the first SAP application and the KDC to obtain a transformed second cyphertext;

de-transforming, by the first SAP application, the transformed second cyphertext using a transformation function based on the paired keys to obtain a second cyphertext;

decrypting, by the first SAP application, the second cyphertext using the paired keys to obtain first a random number generated by the KDC; and generating, by the first SAP application, a symmetric key based at least on the first random number.

9. The method of claim 8, further comprising:

encrypting, by the first SAP application, a message using the symmetric key to obtain an encrypted message; and transmitting, by the first SAP application, the encrypted message to a second SAP application.

10. The method of claim 8, further comprising:

receiving, by the first SAP application, a cyphertext message from a second SAP application; and decrypting, by the first SAP application, the cyphertext message using the symmetric key to obtain a cleartext message.

11. The method of claim 8, wherein said generating, by the first SAP application, a symmetric key comprises:

performing an exclusive-or (XOR) operation on the first random number and a second random number generated by the KDC.

12. The method of claim 8, wherein the paired keys comprise at least one of:

pre-paired keys;

a paired encryption key;

a paired initiation vector nonce; or an input for the transformation function.

13. The method of claim 8, wherein the transformation function comprises at least one of:

a bit rotation function where the number of bits rotated are based on the paired keys;

a block shuffle function where the number of bits shuffled are based on the paired keys;

a square shuffle function where the number of bits shuffled are based on the paired keys; or a cube shuffle function where the number of bits shuffled are based on the paired keys.

14. The method of claim 8, wherein said receiving, by a first secure access portal (SAP) application, a first cyphertext from a key deliver center (KDC) comprises:

receiving the first cyphertext from the KDC over an insecure channel subject to eavesdropping.

15. A computer-readable storage medium comprising program instructions that, when executed by a processor, cause the processor to:

receive, by a first secure access portal (SAP) application, a first cyphertext from a key deliver center (KDC);

decrypt, by the first SAP application, the first cyphertext using paired keys shared between the first SAP application and the KDC to obtain a transformed second cyphertext;

de-transform, by the first SAP application, the transformed second cyphertext using a transformation function based on the paired keys to obtain a second cyphertext;

decrypt, by the first SAP application, the second cyphertext using the paired keys to obtain first a random number generated by the KDC; and generate, by the first SAP application, a delivery key based at least on the first random number.

16. The computer-readable storage medium of claim 15, wherein the program instructions, when executed by the processor, further cause the processor to:

receive, by the first SAP application, a third cyphertext from the KDC;

decrypt, by the first SAP application, the third cyphertext using the delivery key to obtain a symmetric key;

encrypt, by the first SAP application, a message using the symmetric key to obtain an encrypted message; and transmit, by the first SAP application, the encrypted message to a second SAP application.

17. The computer-readable storage medium of claim 15, wherein the program instructions, when executed by the processor, further cause the processor to:

receive, by the first SAP application, a third cyphertext from the KDC;

decrypt, by the first SAP application, the third cyphertext using the delivery key to obtain a symmetric key;

receive, by the first SAP application, a cyphertext message from a second SAP application; and decrypt, by the first SAP application, the cyphertext message using the symmetric key to obtain a cleartext message.

18. The computer-readable storage medium of claim 15, wherein, to generate the delivery key, the program instructions, when executed by the processor, further cause the processor to:

perform an exclusive-or (XOR) operation on the first random number and a second random number generated by the KDC.

19. The computer-readable storage medium of claim 15, wherein the paired keys comprise at least one of:

pre-paired keys;

a paired encryption key;

a paired initiation vector nonce; or an input for the transformation function.

20. The computer-readable storage medium of claim 15, wherein the transformation function comprises at least one of:

a bit rotation function where the number of bits rotated are based on the paired keys;

a block shuffle function where the number of bits shuffled are based on the paired keys;

a square shuffle function where the number of bits shuffled are based on the paired keys; or a cube shuffle function where the number of bits shuffled are based on the paired keys.

\* \* \* \* \*